US012513464B2

(12) United States Patent
Ren et al.

(10) Patent No.: US 12,513,464 B2
(45) Date of Patent: Dec. 30, 2025

(54) SINGLE POWER AMPLIFIER CIRCUIT REALIZES HIGH AND LOW FREQUENCY DIVISION OF A SPEAKER AND ANTI-PHASE MUFFLING OF A RECEIVER, AND SOUNDING DEVICE INCORPORATING SAME

(71) Applicant: AAC Microtech (Changzhou) Co., Ltd., Jiangsu (CN)

(72) Inventors: Zhang Ren, Changzhou (CN); Zhiwei Zhong, Changzhou (CN); Qi Wang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 260 days.

(21) Appl. No.: 18/331,120

(22) Filed: Jun. 7, 2023

(65) Prior Publication Data

US 2024/0073604 A1 Feb. 29, 2024

Related U.S. Application Data

(63) Continuation of application No. PCT/CN2022/120076, filed on Sep. 21, 2022.

(30) Foreign Application Priority Data

Aug. 30, 2022 (CN) ........................ 202211045936.7

(51) Int. Cl.

| | |
|---|---|
| ***H04R 3/14*** | (2006.01) |
| ***H04R 1/24*** | (2006.01) |
| ***H04R 7/12*** | (2006.01) |
| ***H04R 7/18*** | (2006.01) |
| ***H04R 9/02*** | (2006.01) |
| ***H04R 9/06*** | (2006.01) |

(52) U.S. Cl.

CPC ................ *H04R 3/14* (2013.01); *H04R 1/24* (2013.01); *H04R 7/127* (2013.01); *H04R 7/18* (2013.01); *H04R 9/025* (2013.01); *H04R 9/063* (2013.01); *H04R 2400/11* (2013.01)

(58) Field of Classification Search

CPC . H04R 3/14; H04R 1/24; H04R 7/127; H04R 7/18; H04R 9/025; H04R 9/063; H04R 2400/11

See application file for complete search history.

(56) References Cited

U.S. PATENT DOCUMENTS

| | | | | |
|---|---|---|---|---|
| 2009/0285408 A1* | 11/2009 | Kimura ............ | G10K 11/17885 381/71.6 |
| 2018/0160231 A1* | 6/2018 | Bushko .................... | H04R 7/18 |
| 2021/0136492 A1* | 5/2021 | Stoerger ................... | H04R 3/02 |

FOREIGN PATENT DOCUMENTS

KR 102317353 B1 * 10/2021 ............... H04R 1/02

OTHER PUBLICATIONS

English machine translation of KR-102317353-B1 (Lee et al.; Crossover Double Speaker; published Oct. 2021) (Year: 2021).*

* cited by examiner

*Primary Examiner* — Mark Fischer
(74) *Attorney, Agent, or Firm* — Wiersch Law Group

(57) ABSTRACT

The present invention provides a circuit, which includes a first sound signal input end, a second sound signal input end, a power amplifier, a capacitor, a low frequency sounding module and a high frequency sounding module. The present invention also provides a sounding device applying the circuit provided by the present invention. Compared with the related art, the present invention provides a sounding device with simplified structure and wide application.

8 Claims, 8 Drawing Sheets

SINGLE POWER AMPLIFIER CIRCUIT REALIZES HIGH AND LOW FREQUENCY DIVISION OF A SPEAKER AND ANTI-PHASE MUFFLING OF A RECEIVER, AND SOUNDING DEVICE INCORPORATING SAME

TECHNICAL FIELD

The disclosure relates to the field of electro-acoustic transducers, in particular to a circuit for a sounding device used in a portable mobile electronic product.

BACKGROUND ART

The sounding device is widely used in portable mobile electronic products, such as mobile phones, the audio signal is converted into sound for playback, the sounding device has large loudness, and the effect of low-frequency sound and high-frequency sound is good. The circuit used to drive the sounding device has also become an important part of portable mobile electronic products.

The sounding device circuit of the related art includes a plurality of the sounding devices, a power amplifier, and a capacitor.

However, the sounding device circuit of the related art requires multiple the sounding devices in the terminal device application, for example, a plurality of the sounding devices are required on a mobile phone to generate low-frequency sounds, generate high-frequency sounds, and use them as the receiver. Please refer to FIG. 1, FIG. 1 is a structural block view of one of the application scenarios of the sounding device of the related technology on the terminal device: A power amplifier P1 is used to achieve low-frequency sound and high-frequency sound. In specific application, the music signal equipment S1 divides the music signal into two signals after passing through the power amplifier P1. One channel is directly sent to the low pitch speaker U1, and the other channel is sent to the high pitch speaker U2 after connecting the capacitor C in series. In addition, the voice signal equipment S2 send the voice signal to the receiver U3. In this application scenario, the high pitch speaker U2 and the receiver U3 are two independent speakers, and the corresponding drivers are also separated. Please refer to FIG. 2, FIG. 2 is a structural block view of another application scenario of the sounding device of the related technology on the terminal device: The music signal equipment S1 sends its music signal to the low pitch speaker U1 after passing through the power amplifier P1, the music signal equipment s2 sends its music signal to the low pitch speaker U2 by connecting the power amplifier P2 and the capacitor C in series, the voice signal equipment S2 send the voice signal to the receiver U3. In this application scenario, the low pitch speaker U, the high pitch speaker U2 and the receiver U3 are three independent speakers, and the corresponding drivers are also separated, and at least two the power amplifiers are required. The above-mentioned technical solution adopts many devices, and the driving circuit is complicated, which is not conducive to the integrated application.

Therefore, it is necessary to provide a new circuit and a new sounding device to solve the above technical problems.

SUMMARY OF THE INVENTION

The main purpose of the present invention is to provide a circuit and a sounding device with a small number of the power amplifiers, simplified structure and wide applications.

In order to achieve the above-mentioned object, the present disclosure provides a circuit, applied to a sounding device, including: a first sound signal input end for receiving sound signals with high-pitch and low-pitch; a second sound signal input end for receiving voice signals; a power amplifier having a positive end connected to the first sound signal input end, and a negative end connecting to ground; a low frequency sounding module connecting to the output end of the power amplifier; a high frequency sounding module having a first input end, and a second input end; and a capacitor having a first end connecting to an output end of the power amplifier, and a second end connecting to the first input end of the high frequency sounding module. The second sound signal input end is connected to the second input end of the high frequency sounding module.

The present disclosure further provides a sounding device, incorporating the circuit as described above, including a first vibration system for vibrating and generating low-pitch sound, and a second vibration system for vibrating and generating high-pitch sound and for serving as a receiver function to sound; wherein the output end of the power amplifier is connected to the first vibration system; the second end of the capacitor and the second sound signal input end are both connected to the second vibration system.

In addition, the sounding device further comprises a frame and a magnetic circuit system fixed on the frame; wherein the first vibration system and the second vibration system are coaxially arranged and located on opposite sides of the magnetic circuit system, respectively; the first vibration system includes a first diaphragm fixed on the frame and a first voice coil fixed on the first diaphragm; the second vibration system includes a second diaphragm fixedly supported on the magnetic circuit system and a second voice coil that drives the second diaphragm to vibrate and produce sound; the magnetic circuit system includes a first magnetic gap and a second magnetic gap, the first magnetic gap is arranged around the second magnetic gap; the first voice coil is inserted in the first magnetic gap and drives the first diaphragm to vibrate to generate low-pitch sound, the second voice coil is inserted in the second magnetic gap and drives the second diaphragm to vibrate to generate high-pitch sound.

In addition, the magnetic circuit system includes a magnetic yoke, a primary magnet group respectively fixed on the side of the magnetic yoke close to the first diaphragm, and an auxiliary magnet group surrounding the primary magnet group; the auxiliary magnet group is separated from the primary magnet group to form the first magnetic gap, and the magnetic yoke is annular; the primary magnet group includes an annular primary magnet, and a main pole plate covered and fixed on the primary magnet away from the magnetic yoke and an auxiliary magnet; the primary magnet and the inner wall of the magnetic yoke together form an inner cavity.

The main pole plate includes a main pole plate body fixed to the primary magnet, and a protruding part of the main pole plate extending from the inner periphery of the main pole plate body into the inner cavity; the auxiliary magnet cover is fixed on the side of the main pole plate body away from the magnetic yoke; the primary magnet and the magnetic yoke which jointly surround the protruding part of the main pole plate, and together with the protruding part of the main pole plate form the second magnetic gap with an opening facing the second vibration system; the protruding part of the main pole plate is a hollow ring.

In addition, the sounding device further comprises an annular support rack fixed on a side of the magnetic yoke away from the frame, wherein a peripheral support of the second diaphragm is fixed on the side of the support rack away from the magnetic yoke; the magnetic circuit system and the second vibration system together form a lower cavity, and the lower cavity is connected with the second magnetic gap.

In addition, the second diaphragm includes a vibration part of the second diaphragm spaced from the magnetic yoke, a suspension of the second diaphragm extending from the outer periphery of the vibration part of the second diaphragm, and a connection part of the second diaphragm which is bent and extended from the suspension of the second diaphragm to the support rack; the connection part of the second diaphragm is fixed to the support rack; the second vibration system also includes a second skeleton; the side of the second skeleton close to the magnetic circuit system is fixed to the second voice coil, the side of the second skeleton away from the magnetic circuit system is fixed to the vibration part of the second diaphragm.

In addition, the second skeleton includes an annular a first fixed part, and an elastic arm that is bent and extended from the inner side of the first fixed part, and a second fixed part extending from the elastic arm away from the first fixed part; the connection part of the second diaphragm and the support rack are respectively fixed on opposite sides of the first fixed part, the vibration part of the second diaphragm and the second voice coil are respectively fixed on opposite sides of the second fixed part; the auxiliary magnet group includes the auxiliary magnet fixed on the magnetic yoke, and the auxiliary pole plate covered and fixed on the side of the auxiliary magnet away from the magnetic yoke; the second skeleton also includes a third fixed part that is bent and extended from the outside of the first fixed part to the direction of the frame; the auxiliary pole plate is fixed to the frame, the third fixed part is fixed to the side of the auxiliary pole plate away from the frame; the frame is rectangular; the number of the auxiliary pole plate is two, the two auxiliary pole plates are respectively located on opposite sides of the long axis of the frame.

In addition, the first diaphragm is annular, the inner peripheral side of the first diaphragm is fixed to the auxiliary magnet, and the outer peripheral side of the first diaphragm is fixed to the frame.

In addition, the first vibration system further includes a first skeleton which is annular, the first voice coil is fixed on one side of the first skeleton close to the magnetic circuit system; the first diaphragm includes a first folded ring which is annular and a second folded ring which is annular; the first folded ring is arranged around the second folded ring and is spaced apart from the first folded ring; the second folded ring is arranged to surround the auxiliary magnet, the inner peripheral side of the second folded ring is fixed to the outer side of the auxiliary magnet; the first skeleton acts as the dome of the first diaphragm, the outer peripheral side is fixed to the inner peripheral side of the first folded ring, the inner peripheral side is fixed to the outer peripheral side of the second folded ring; and the outer peripheral side of the first folded ring is fixed on the frame.

In addition, the first skeleton includes a first section which is annular, and a second section bent and extended from the inner peripheral side of the first section to the first voice coil, and a third section that is bent and extended from the inner peripheral side of the first section to the direction of the magnetic yoke; the first voice coil is fixed on the side of the second section close to the magnetic yoke, the side of the second section away from the magnetic yoke is fixed to the outer peripheral side of the second folded ring; the first vibration system further includes an elastic support assembly arranged spaced from the first folded ring; one end of the elastic support assembly is fixed on the frame, and the other end of the elastic support assembly is fixed on the third section.

Compared with the related art, the circuit of the present invention is applied to the sounding device, the first sound signal input end with high-pitch sound and low-pitch sound is connected to the positive input end of the power amplifier, and then split into two route signals of high-pitch sound and low-pitch sound through the power amplifier. The splited bass signal is directly input to the low frequency sounding module for sound, the splited high-frequency signal is input to the high frequency sounding module by connecting the capacitor in series to produce sound. This structure allows the low frequency sounding module to generate low-pitch sound and the high frequency sounding module to generate high-pitch sound in the circuit of the present invention, the voice signal is input to the second input end of the high frequency sounding module through the second sound signal input end. When the high frequency sounding module of the present invention is used as the receiver, the low frequency sounding module can be used as the anti-phase muffler. At the same time, the circuit of the present invention only needs a power amplifier to realize various application functions, so that the structure is simple and the application is wide.

DETAILED DESCRIPTION OF EXEMPLARY EMBODIMENT

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
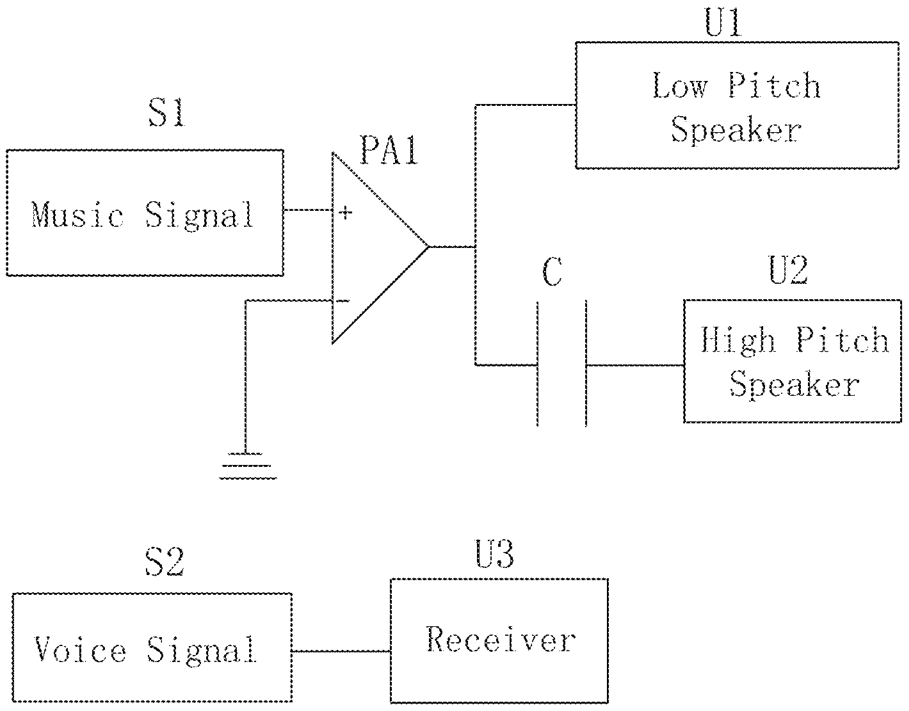
Fig. 1 (Prior Art)
FIG. 1 is a structural block view of one application scenario of a circuit of a related art on a terminal device.
Figure 2:
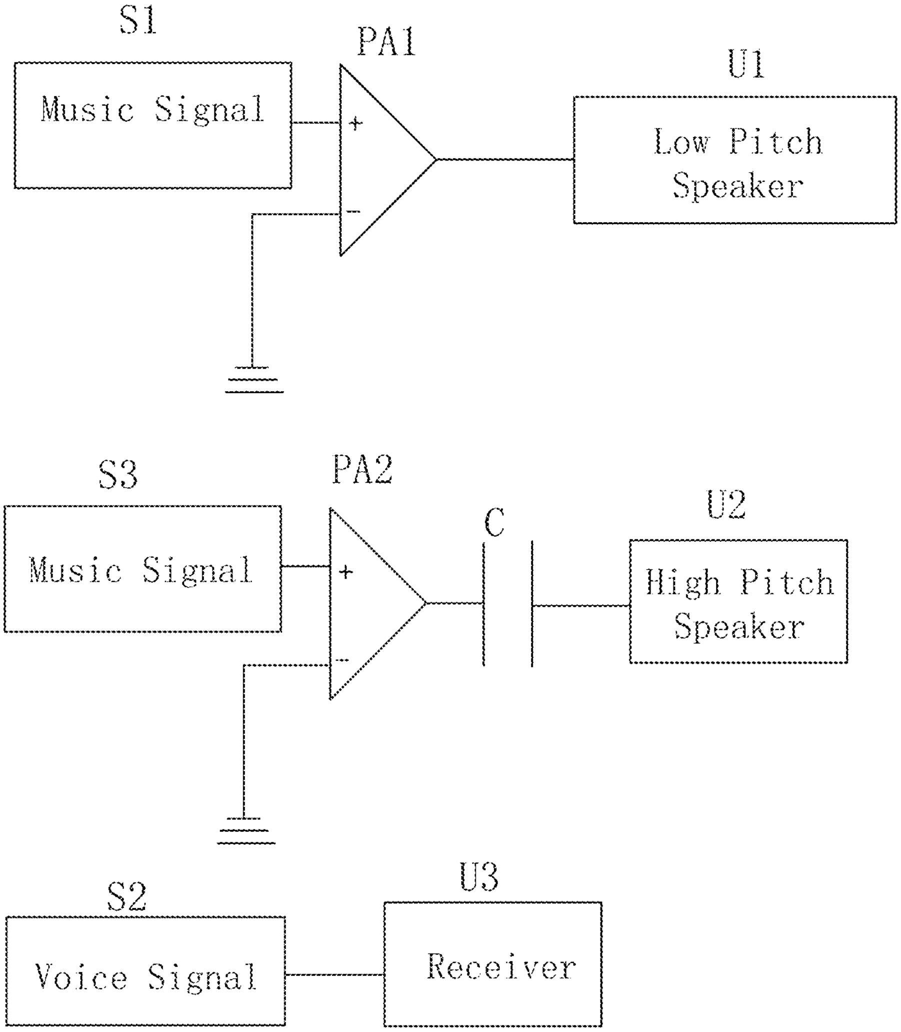
Fig. 2 (Prior Art)
FIG. 2 is a structural block view of another application scenario of a circuit of a related art on a terminal device.
Figure 3:
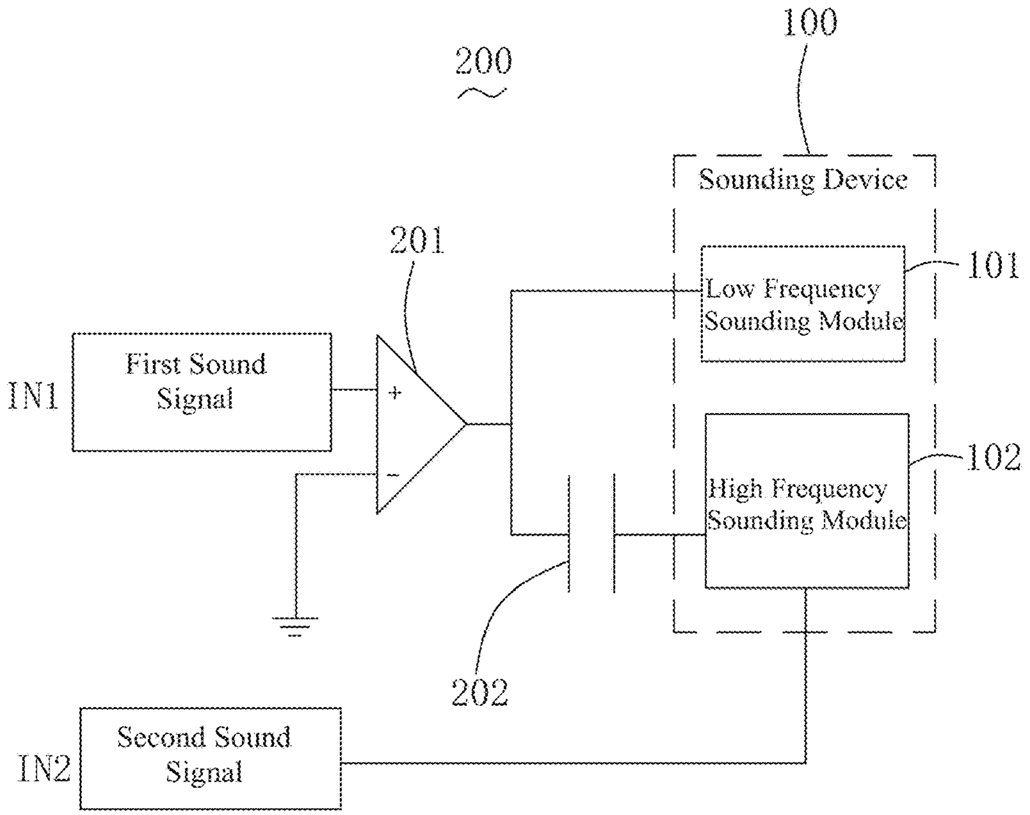
FIG. 3 is a schematic view of the circuit of the present invention.
Figure 4:
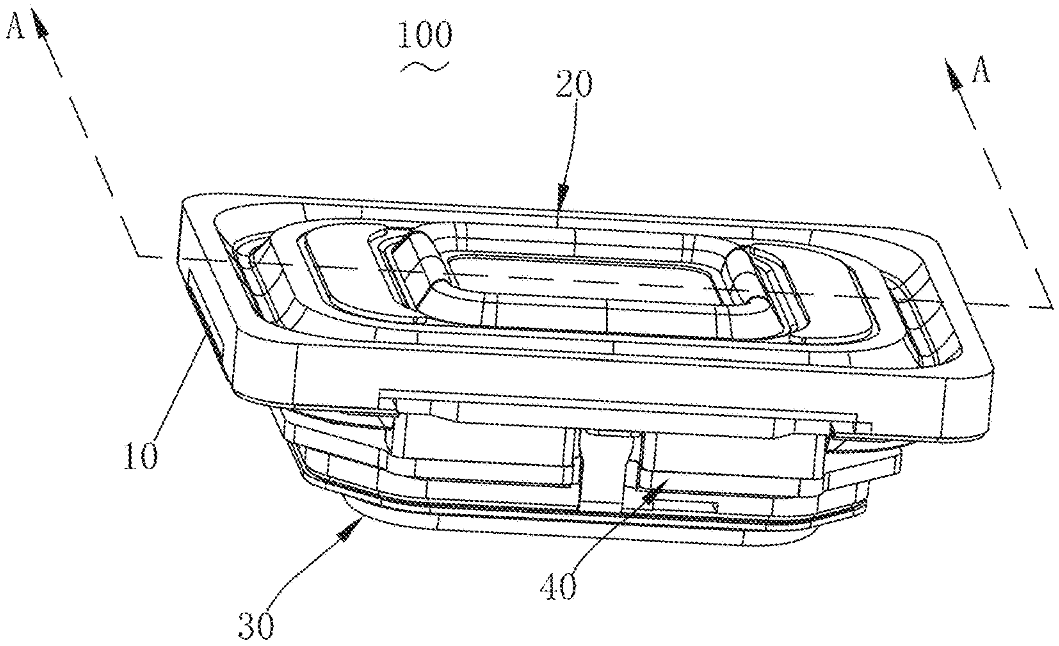
FIG. 4 is an isometric view of a sounding device of an embodiment of the present invention.
Figure 5:
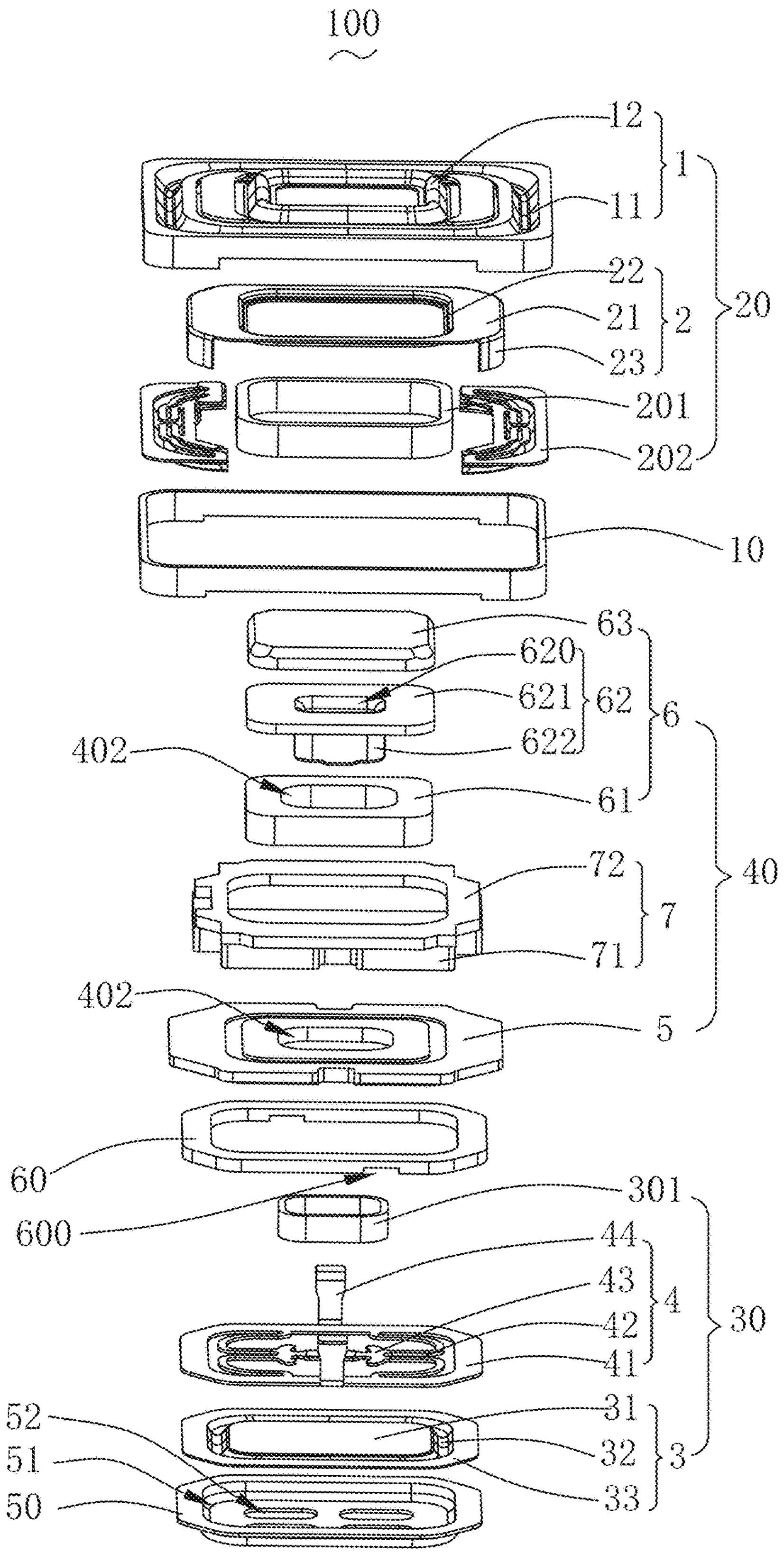
FIG. 5 is an exploded view of the sounding device of the present invention.
Figure 6:
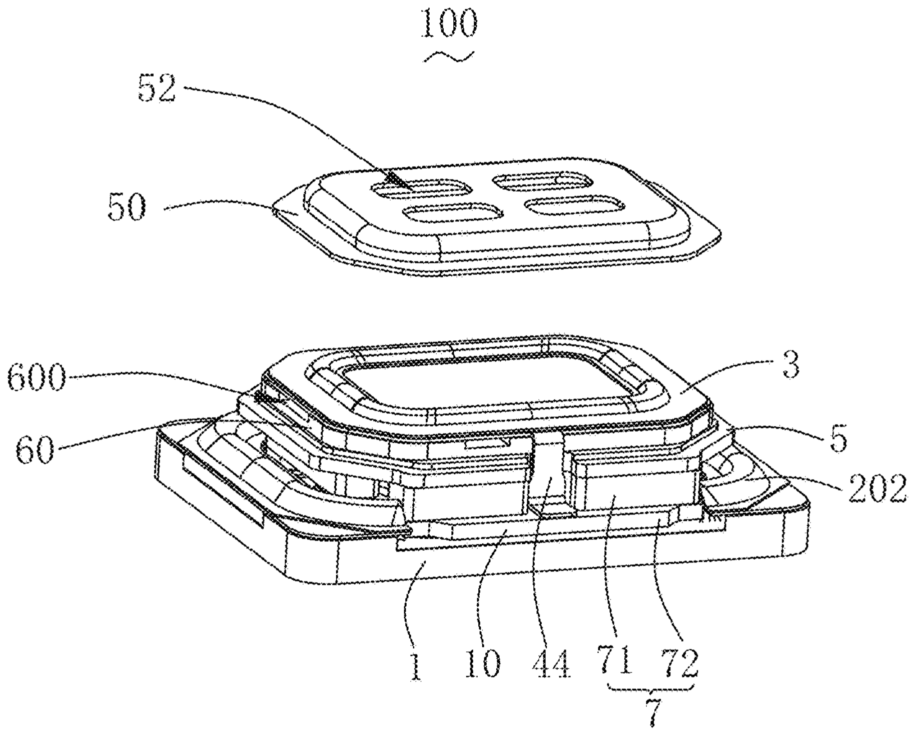
FIG. 6 is an exploded of the sounding device of the present invention from another aspect.
Figure 7:
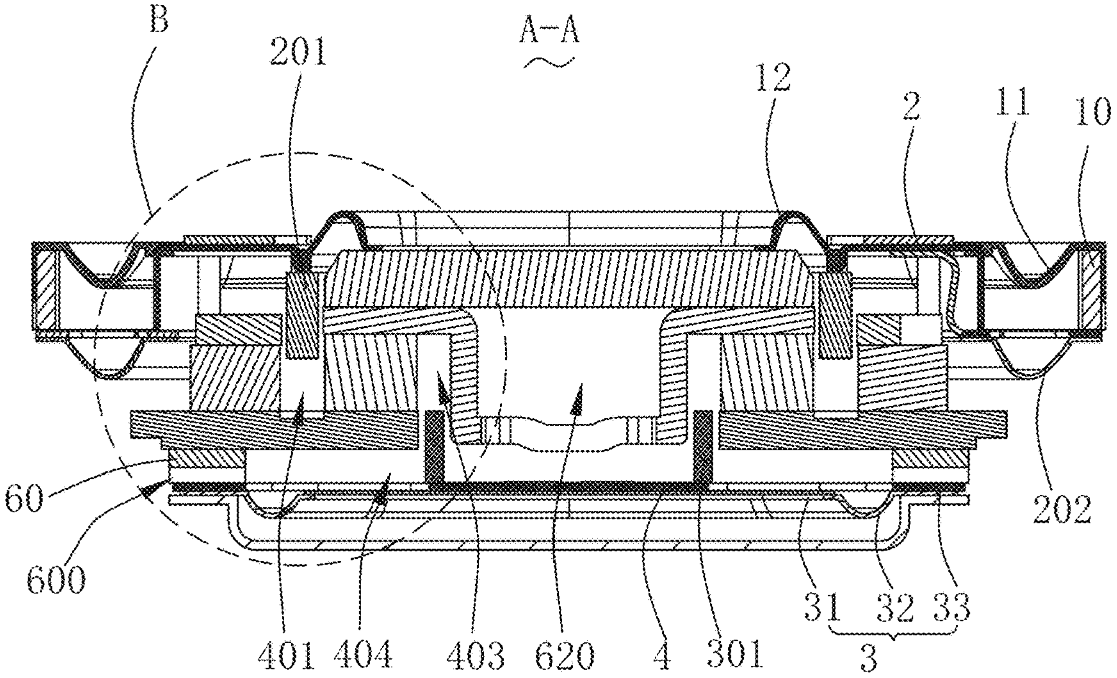
FIG. 7 is a cross-sectional view taken along line A-A in FIG. 4.
Figure 8:
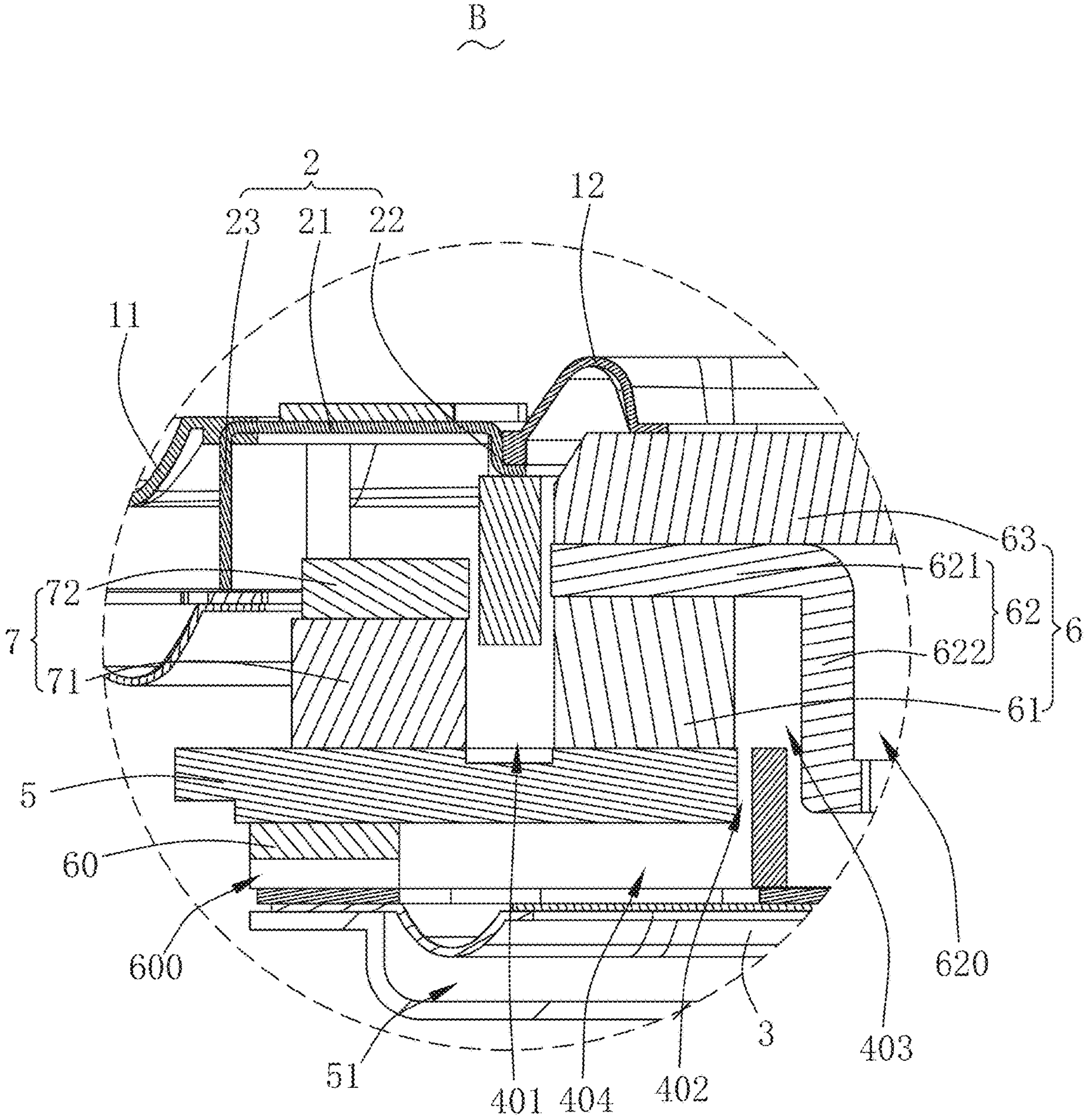
FIG. 8 is an enlarged view of Part B in FIG. 7.
Figure 9:
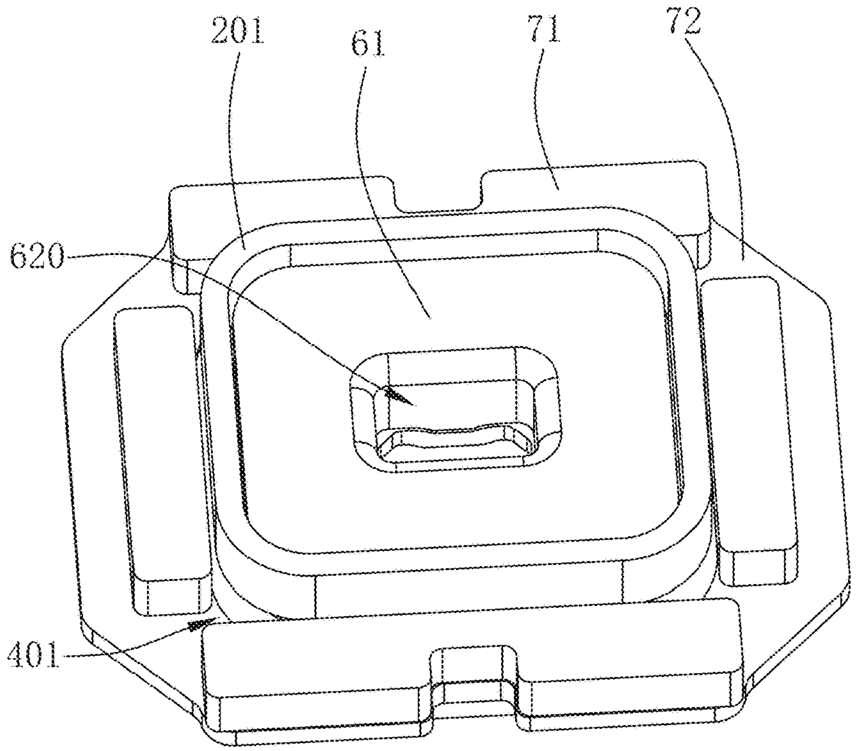
FIG. 9 is an isometric view of an assembly of a primary magnet, an auxiliary magnet group and a first voice coil of the sounding device of the present invention.
Figure 10:
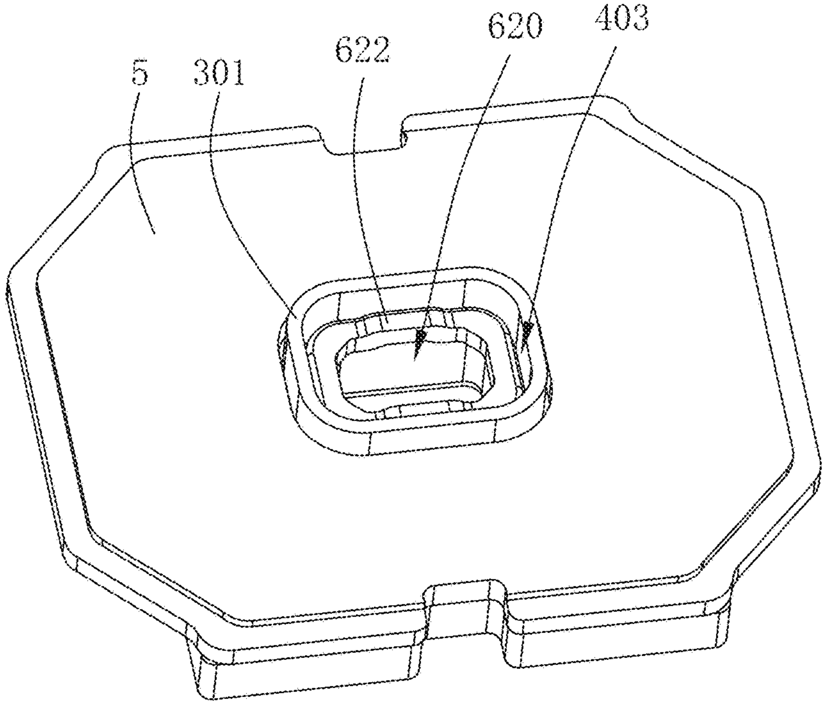
FIG. 10 is an isometric view of an assembly of a magnetic yoke, a protruding part of a main pole plate and a second voice coil of the sounding device of the present invention.
Figure 11:
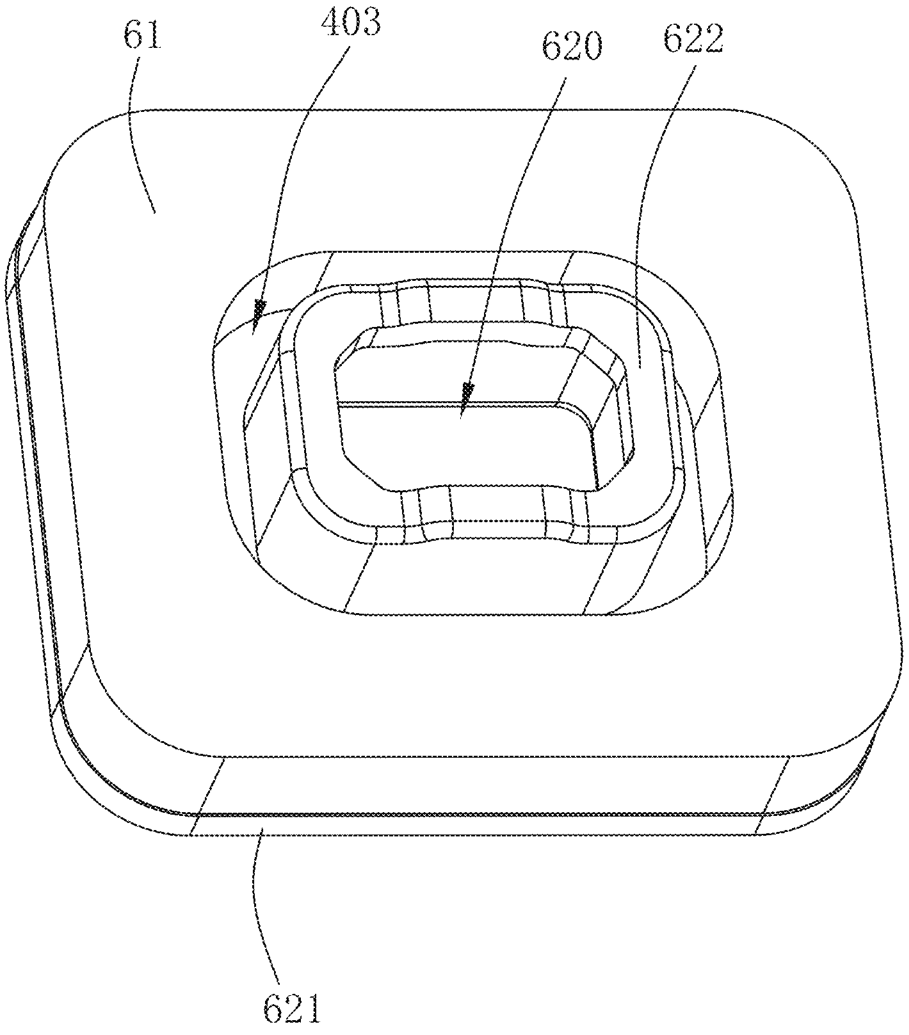
FIG. 11 is a three-dimensional schematic view of the primary magnet group of the sounding device of the present invention.

Referring to FIG. 3, the present invention provides a circuit 200 and a sounding device 100. The circuit 200 is applied to the sounding device 100.

The circuit 200 includes a first sound signal input end IN1, a second sound signal input end S2, a power amplifier 201, a capacitor 202 and a low frequency sounding module 101 and a high frequency sounding module 102.

The first sound signal input end IN1 is used to receive a sound signal with high and low pitch, such as music signals. The second sound signal input end IN2 is used for receiving voice signals. The low frequency sounding module 101 is used to generate low frequency sound. The high frequency sounding module 102 is used to emit high frequency sound and can be used as the receiver function to generate sound.

The first sound signal input end IN1 is connected to the positive input end of the power amplifier 201. The negative input end of the power amplifier 201 is connected to ground. The output end of the power amplifier 201 is respectively connected to the input end of the low frequency sounding module 101 and the first end of the capacitor. The second end of the capacitor is connected to the first input end of the high frequency sounding module 102. The second sound signal input end IN2 is connected to the second input end of the high frequency sounding module 102.

The first sound signal input end IN1 will have a music signal with high and low-pitch pass through the power amplifier 201, then the signal is divided into two channels, and one channel is directly sent to the input end of the low frequency sounding module 101 for the low frequency sounding module 101 to generate low-frequency sound. The other path is sent to the first input end of the high frequency sounding module 102 through the capacitor 202 in series, for the high frequency sounding module 102 to generate high frequency sound. In addition, the second sound signal input end IN2 directly sends the voice signal to the second input end of the high frequency sounding module 102. When the high frequency sounding module 102 is applied as the receiver, the low frequency sounding module 101 can be used as the anti-phase muffler. Therefore, the circuit 200 of the present invention only needs a power amplifier to realize various application functions, so that the structure is simple and the application is wide.

The present invention also provides a sounding device 100 in which the circuit 200 is applied. Specifically, the sounding device 100 includes a frame 10, a first vibration system 20 respectively fixed on the frame 10 for vibrating to generate low-pitch sound, and a second vibration system 30 and a magnetic circuit system 40 for vibrating to generate high-pitched sound.

Wherein, the first vibration system 20 and the second vibration system 30 are coaxially arranged and located on opposite sides of the magnetic circuit system 40 respectively. This structure enables the second vibration system 30 to be arranged on the opposite side of the first vibration system 20 to emit sound, and enables the first vibration system 20 and the second vibration system 30 to achieve coaxial full-band sound, so that the circuit 200 of the present invention has a good acoustic effect.

At the same time, the second vibration system 30 can also be used as the receiver function to sound. Specifically, the second vibration system 30 and the magnetic circuit system 40 cooperate as the receiver, so that the first vibration system 10 and the magnetic circuit system 40 form a speaker which can be used as an anti-phase muffler.

In this embodiment, the first vibration system 20 and the magnetic circuit system 40 form the low frequency sounding module 101. The second vibration system 30 and the magnetic circuit system 40 form the high frequency sounding module 102.

The first sound signal input end IN1 is connected to the positive input end of the power amplifier 201. The negative input end of the power amplifier 201 is connected to ground. The output end of the power amplifier 201 is connected to the first input end of the sounding device 100 and the first end of the capacitor 202 respectively. The second end of the capacitor 202 is connected to the second input end of the sounding device 100. The second sound signal input end S2 is connected to the third input ends of the sounding device 100.

Wherein, the first input end of the sounding device 100 is connected to the first vibration system 20. Both the second input end of the sounding device 100 and the third input end of the sounding device 100 are connected to the second vibration system 30.

The first sound signal input end IN1 divides the music signal with treble and bass into two signals after passing through the power amplifier 201. One route is directly sent to the low-pitch speaker formed by the magnetic circuit system 40 and the second vibration system 20, the other route, through the capacitor 202 in series is sent to the magnetic circuit system 40 in the sounding device 100 and the high-pitch speaker formed by the second vibration system 30. In addition, the second sound signal input end IN2 directly sends the voice signal to the magnetic circuit system 40 in the sounding device 100 and the high pitch speaker formed by the second vibration system 30. When applying the second vibration system 30 and the magnetic circuit system 40 of the sounding device to form the speaker as the receiver, the first vibration system 20 and the magnetic circuit system 40 form the speaker which can act as the anti-phase muffler. Therefore, the circuit 200 of the present invention only needs a power amplifier to realize various application functions, so that the structure is simple and the application is wide.

In this embodiment, please refer to FIGS. 4-11 at the same time, the sounding device 100 includes a frame 10, a first vibration system 20, a second vibration system 30, a magnetic circuit system 40 and a front cover 50 which are respectively fixed on the frame 10. The frame 1 is annular.

The first vibration system 20 comprises a first diaphragm 1 that is fixed on the frame 10, a first voice coil 201 fixed to the first diaphragm 1, a first skeleton 2 which is annular and an elastic support assembly 202. The first voice coil 201 is fixed to the side of the first skeleton 2 close to the magnetic circuit system 40.

The second vibration system 30 is disposed on the side of the magnetic circuit system 40 away from the first vibration system 20 with space. The second vibration system 30 includes a second diaphragm 3, which is fixedly supported on the magnetic circuit system 40, a second voice coil 301 that drive the second diaphragm 3 to vibrate and produce sound and a second skeleton 4.

The magnetic circuit system 40 includes a magnetic yoke 5, a primary magnet group respectively fixed on the magnetic yoke 5 near the first diaphragm 1 side, an auxiliary magnet group 7 surrounding the primary magnet group 6.

The magnetic yoke 5 is annular. The second diaphragm 3 is spaced apart from the magnetic yoke 5.

The primary magnet group 6 includes a primary magnet 61 which is annular, a main pole plate 62 covered and fixed on the side of the primary magnet 61 away from the magnetic yoke 5. The inner wall of the primary magnet 61 and the inner wall of the magnetic yoke 5 together form an inner cavity 402.

The magnetic circuit system 40 includes a first magnetic gap 401 and a second magnetic gap 403. The first magnetic gap 401 is arranged around the second magnetic gap 403. In this embodiment, a second magnetic gap 403 is provided on the side of the magnetic circuit system 40 away from the first vibration system 20. Specifically, the main pole plate 62 includes a main pole plate body 621 fixed on the primary magnet 61, and a protruding part of the main pole plate 622 extending from the inner periphery of the main pole plate body 621 to the inner cavity 402 by bending. The primary magnet 61 and the magnetic yoke 5 jointly surrounding the protruding part of the main pole plate 622, and together with the protruding part of the main pole plate 622 form the second magnetic gap 403 with an opening facing the second vibration system 30. The second voice coil 301 is inserted in the second magnetic gap 403 and drives the second diaphragm 3 to vibrate and sound, so that the second vibration system 30 and the magnetic circuit system 40 form a high-pitch speaker, it is realized that the sounding device 100 provides a high-pitched sound effect function and can be used as the receiver, so that the circuit 200 has a simple structure and is widely used.

The auxiliary magnet group 7 is spaced from the primary magnet group 6 to form the first magnetic gap 401. The first voice coil 201 is inserted into the first magnetic gap 401 and drives the first diaphragm 1 to vibrate and produce sound. This structure enables the first voice coil 201 of the first vibration system 20 to be inserted into the first magnetic gap 401 and drive the first diaphragm 1 to vibrate to emit low-frequency sound, so that the first vibration system 20 and the magnetic circuit system 40 form a low-pitch speaker. It is realized that the sounding device 100 provides a bass sound effect function, so that the circuit 200 has good acoustic performance and is widely used.

The second diaphragm 3 and the first diaphragm 1 are respectively disposed on opposite sides of the sounding device 100. The second voice coil 301 and the first voice coil 201 are coaxially arranged. This structure allows the second vibration system 30 of the formed high pitch speaker to be disposed on the opposite side of the first vibration system 20 of the formed low pitch speaker to generate sound. This structure enables the first vibration system 20 and the second vibration system 30 to achieve coaxial full-band sound, so that the sounding device 100 of the present invention has good acoustic performance. When the second vibration system 30 and the magnetic circuit system 40 of the sounding device 100 of the present invention are applied to form the high pitch speaker as the receiver, the low pitch speaker formed by the first vibration system 20 and the magnetic circuit system 40 can be used as the anti-phase muffler. Meanwhile, the circuit 200 of the present invention only needs a power amplifier to realize various application functions, so that the circuit 200 has a simple structure and is widely used.

In this embodiment, the main pole plate 62 is provided with a middle hole 620 penetrating the main pole plate 62. The middle hole 620 penetrates the main pole plate body 621 and the protruding part of the main pole plate 622 in sequence. The middle hole 620 forming a main pole plate 62 with a hollow middle part is provided. The protruding part of the main pole plate 622 extends to the inner cavity 402 so that the middle hole 620 is connected with the inner cavity 402 to form a big empty cavity, the empty cavity improves the high frequency performance of the sounding device 100. This structure advantageously improves the good acoustic performance of the high pitch speaker formed by the second vibration system 30 and the magnetic circuit system 40, and good acoustic performance when used as the receiver.

In this embodiment, the magnetic field of the primary magnet group 6 is strengthened. The primary magnet group 6 also includes an auxiliary magnet 63 fixed on the side of the main pole plate body 621 away from the magnetic yoke 5 is covered. The auxiliary magnet 63 closes the middle hole 620, what is achieved is that the second vibration system 30 and the magnetic circuit system 40 form good acoustic performance of the high pitch speaker, and good acoustic performance when used as the receiver.

In this embodiment, the first diaphragm 1 is annular. The inner peripheral side of the first diaphragm 1 is fixed to the auxiliary magnet 63. The outer peripheral side of the first diaphragm 1 is fixed to the frame 10. Specifically, the first diaphragm 1 includes a first folded ring 11 that is annular and a second folded ring 12 that is annular. The first folded ring 11 is arranged around the second folded ring 12 and is spaced apart from the first folded ring 11. The second folded ring 12 is arranged around the auxiliary magnet 63. The inner peripheral side of the second folded ring 12 is fixed to the outer side of the auxiliary magnet 63. The first skeleton 2 acts as the dome of the first diaphragm 1, the outer peripheral side of the first skeleton 2 is fixed on the inner peripheral side of the first folded ring 11, the inner peripheral side of the first skeleton 2 is fixed on the outer peripheral side of the second folded ring 12.

The outer peripheral side of the first folded ring 11 is fixed on the frame 10. This structure enables the thickness of the sounding device 100 of the present invention to reuse the height of the magnetic circuit system 40. The first diaphragm 1 of the first vibration system 20 is arranged outside the auxiliary magnet 63, the thickness of the sounding device 100 occupied by the low pitch speaker of the first vibration system 20 and the magnetic circuit system 40 is reduced, and the size of the low pitch speaker is increased at the same time, so that the acoustic performance of the sounding device 100 in terms of bass is improved, so that the circuit 200 has good acoustic performance and is widely used.

In this embodiment, the first skeleton 2 is fixed to the first voice coil 201 on the side close to the magnetic circuit system 40. Specifically, the first skeleton 2 includes a first section 21 which is annular, a second section 22, which is bent and extended to the first voice coil 201 from the inner peripheral side of the first section 21, and a third section 23 which is bent and extended from the inner peripheral side of the first section 21 to the direction of the magnetic yoke 5. The first voice coil 201 is fixed to the side of the second section 22 close to the magnetic yoke 5. The side of the second section 22 away from the magnetic yoke 5 is fixed to the outer peripheral side of the second folded ring 12. The structure of the first skeleton 2 is beneficial to make the thickness of the sounding device 100 very thin, and at the same time increase the size of the low pitch speaker, thereby improving the acoustic performance of the sounding device 100 in terms of bass, so that the acoustic performance of the circuit 200 is good and Wide range of applications.

In this embodiment, the first vibration system 20 further includes an elastic support assembly 202 arranged with space from the first folded ring 11. One end of the elastic support assembly 202 is fixed to the frame 10. The other end of the elastic support assembly 202 is fixed to the third section 23. On the one hand, the elastic support assembly 202 is used to strengthen the vibration effect of the first diaphragm 1 and improve the acoustic performance of the sounding device 100. On the other hand, it is used to balance the swing of the first vibration system 20 and improve the stability of the sounding device 100, so that the sounding device 100 has good acoustic performance and is widely used.

In this embodiment, the frame 10 is rectangular. The number of the elastic support assembly 202 is two. The two elastic support assemblies 202 are located on opposite sides of the short axis of the frame 10, respectively. The two elastic support assemblies 202 symmetrically distributed support the first voice coil 201 more stably and better vibration reliability is achieved.

In this embodiment, the sounding device 100 further includes a support rack 60 which is annular. The support rack 60 is fixed on the side of the magnetic yoke 5 away from the frame 10. The peripheral edge of the second diaphragm 3 is supported and fixed on the side of the support rack 60 away from the magnetic yoke 5.

The magnetic circuit system 40 and the second vibration system 30 together form the lower cavity 404. The lower cavity 404 is connected with the second magnetic gap 403.

Specifically, the support rack 60 is provided with a leak hole 600 extending therethrough. The lower cavity 404 is connected with the outside through the leak hole 600. The setting of the leak hole 600 is beneficial to balance the air pressure of the lower cavity 404 and the outside, so that the acoustic performance of the high pitch speaker formed by the magnetic circuit system 40 and the second vibration system 30 is improved, and it can be better converted into the receiver. Therefore, the sounding device 100 has good acoustic performance and is widely used.

In this embodiment, the second diaphragm 3 includes a vibration part of the second diaphragm 31, spaced from the magnetic yoke 5, a suspension of the second diaphragm 32 which is folded and extended from the outer periphery of the vibration part of the second diaphragm 31, and a connection part of the second diaphragm 33 extending from the suspension of the second diaphragm 32 to the support rack 60. The connection part of the second diaphragm 33 is fixed to the support rack 60.

The side of the second skeleton 4 close to the magnetic circuit system 40 is fixed to the second voice coil 301. The side of the second skeleton 4 away from the magnetic circuit system 40 is fixed to the vibration part of the second diaphragm 31. Specifically, the second skeleton 4 includes a first fixed part 41 in the form of a ring, an elastic arm 42, which is bent and extended from the inner side of the first fixed part 41, and a second fixed part 43 extending away from the first fixed part 41 from the elastic arm 42.

Wherein, the connection part of the second diaphragm 33 and the support rack 60 are respectively fixed on opposite sides of the first fixed part 41 The vibration part of the second diaphragm 31 and the second voice coil 301 are respectively fixed on opposite sides of the second fixed part 43. In the structure of the second skeleton 4, the second diaphragm 3 is respectively fixed with the support rack 60 and the second voice coil 301, the vibration effect of the vibration part of the second diaphragm 31 is enhanced and the reliability of the vibration part of the second diaphragm 31 is improved because of the elasticity of the elastic arm 42 of the second skeleton 4, so that the stability and acoustic performance of the sounding device 100 are improved, so that the acoustic performance of the circuit 200 is good and widely used.

In this embodiment, the auxiliary magnet group 7 includes an auxiliary magnet 71 fixed to the magnetic yoke 5, an auxiliary pole plate 72 which is covered and fixed on the side of the auxiliary magnet 71 away from the magnetic yoke 5.

The second skeleton 4 also includes a third fixed part 44 which is bent and extended from the outside of the first fixed part 41 to the direction of the frame 10.

The auxiliary pole plate 72 is fixed to the frame 10. The third fixed part 44 is fixed to the side of the auxiliary pole plate 72 away from the frame 10. Wherein, the frame 10 is rectangular. The number of the auxiliary pole plates 72 is two. The two auxiliary pole plates 72 are located on opposite sides of the long axis of the frame 10, respectively. This structure facilitates the fixing of the second diaphragm 3 on the frame 10, thereby improving the stability and acoustic performance of the sounding device 100.

The front cover 50 is covered and fixed on the second diaphragm 3 and together with the second diaphragm 3 forms a front sound cavity 51. The front cover 50 is provided with a front sound hole 52 therethrough. The front sound cavity 51 is connected with the outside through the front sound hole 52. The structure of the front sound cavity 51 is beneficial to improve the effect of the second diaphragm 3 to generate high-frequency sound. The front cover 50 protects the second diaphragm 3 from external damage, which is beneficial to be used as the receiver, thereby improving the stability and acoustic performance of the sounding device 100, so that the circuit 200 has good acoustic performance and is widely used.

Compared with the related art, in the circuit of the present invention, it is applied to the sounding device, the first sound signal input end with high-pitch and low-pitch is connected to the positive input end of the power amplifier, at the same time, the power amplifier is divided into two path signals of high-pitch and low pitch, the separated high-pitch signal is directly input to the low frequency sounding module for sound, the separated low-pitch signal is input to the high frequency sounding module by connecting the capacitor in series to produce sound. This structure allows the low frequency sounding module to generate low-pitch sound and the high frequency sounding module to generate high-pitch sound In the circuit of the present invention, the voice signal is input to the second input end of the high frequency sounding module through the second sound signal input end, when applying the high frequency sounding module of the present invention as the receiver, the low frequency sounding module can be used as the anti-phase muffler, at the same time, the circuit of the present invention only needs a power amplifier to realize various application functions, so that the structure is simple and the application is wide.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sounding device, incorporating a circuit, including a first vibration system for vibrating and generating low-pitch sound, and a second vibration system for vibrating and generating high-pitch sound and for serving as a receiver function to sound; wherein the circuit including: a first sound signal input end for receiving sound signals with high-pitch and low-pitch; a second sound signal input end for receiving voice signals;

a power amplifier having a positive end connected to the first sound signal input end, and a negative end connecting to ground; a low frequency sounding module connecting to the output end of the power amplifier; a high frequency sounding module having a first input end, and a second input end; a capacitor having a first end connecting to an output end of the power amplifier, and a second end connecting to the first input end of the high frequency sounding module; wherein the second sound signal input end is connected to the second input end of the high frequency sounding module;

the output end of the power amplifier is connected to the first vibration system; the second end of the capacitor and the second sound signal input end are both connected to the second vibration system;

the sounding device further comprising a frame and a magnetic circuit system fixed on the frame; wherein the first vibration system and the second vibration system are coaxially arranged and located on opposite sides of the magnetic circuit system, respectively; the first vibration system includes a first diaphragm fixed on the frame and a first voice coil fixed on the first diaphragm; the magnetic circuit system includes a magnetic yoke, a primary magnet group respectively fixed on the side of the magnetic yoke close to the first diaphragm, and an auxiliary magnet group surrounding the primary magnet group; the primary magnet group includes an annular primary magnet, and a main pole plate covered and fixed on the primary magnet away from the magnetic yoke and an auxiliary magnet; the first diaphragm is annular, the inner peripheral side of the first diaphragm is fixed to the auxiliary magnet, and the outer peripheral side of the first diaphragm is fixed to the frame.

2. The sounding device as described in claim 1, wherein, the second vibration system includes a second diaphragm fixedly supported on the magnetic circuit system and a second voice coil that drives the second diaphragm to vibrate and produce sound; the magnetic circuit system includes a first magnetic gap and a second magnetic gap, the first magnetic gap is arranged around the second magnetic gap; the first voice coil is inserted in the first magnetic gap and drives the first diaphragm to vibrate to generate low-pitch sound, the second voice coil is inserted in the second magnetic gap and drives the second diaphragm to vibrate to generate high-pitch sound.

3. The sounding device as described in claim 2, wherein, the the auxiliary magnet group is separated from the primary magnet group to form the first magnetic gap, and the magnetic yoke is annular; the primary magnet and the inner wall of the magnetic yoke together form an inner cavity; the main pole plate includes a main pole plate body fixed to the primary magnet, and a protruding part of the main pole plate extending from the inner periphery of the main pole plate body into the inner cavity; the auxiliary magnet cover is fixed on the side of the main pole plate body away from the magnetic yoke; the primary magnet and the magnetic yoke which jointly surround the protruding part of the main pole plate, and together with the protruding part of the main pole plate form the second magnetic gap with an opening facing the second vibration system; the protruding part of the main pole plate is a hollow ring.

4. The sounding device as described in claim 3, further comprising an annular support rack fixed on a side of the magnetic yoke away from the frame, wherein a peripheral support of the second diaphragm is fixed on the side of the support rack away from the magnetic yoke; the magnetic circuit system and the second vibration system together form a lower cavity, and the lower cavity is connected with the second magnetic gap.

5. The sounding device as described in claim 4, wherein, the second diaphragm includes a vibration part of the second diaphragm spaced from the magnetic yoke, a suspension of the second diaphragm extending from the outer periphery of the vibration part of the second diaphragm, and a connection part of the second diaphragm which is bent and extended from the suspension of the second diaphragm to the support rack; the connection part of the second diaphragm is fixed to the support rack; the second vibration system also includes a second skeleton; the side of the second skeleton close to the magnetic circuit system is fixed to the second voice coil, the side of the second skeleton away from the magnetic circuit system is fixed to the vibration part of the second diaphragm.

6. The sounding device as described in claim 5, wherein, the second skeleton includes an annular a first fixed part, and an elastic arm that is bent and extended from the inner side of the first fixed part, and a second fixed part extending from the elastic arm away from the first fixed part; the connection part of the second diaphragm and the support rack are respectively fixed on opposite sides of the first fixed part, the vibration part of the second diaphragm and the second voice coil are respectively fixed on opposite sides of the second fixed part; the auxiliary magnet group includes the auxiliary magnet fixed on the magnetic yoke, and the auxiliary pole plate covered and fixed on the side of the auxiliary magnet away from the magnetic yoke; the second skeleton also includes a third fixed part that is bent and extended from the outside of the first fixed part to the direction of the frame; the auxiliary pole plate is fixed to the frame, the third fixed part is fixed to the side of the auxiliary pole plate away from the frame; the frame is rectangular; the number of the auxiliary pole plate is two, the two auxiliary pole plates are respectively located on opposite sides of the long axis of the frame.

7. The sounding device as described in claim 3, wherein, the first vibration system further includes a first skeleton which is annular, the first voice coil is fixed on one side of the first skeleton close to the magnetic circuit system; the first diaphragm includes a first folded ring which is annular and a second folded ring which is annular; the first folded ring is arranged around the second folded ring and is spaced apart from the first folded ring; the second folded ring is arranged to surround the auxiliary magnet, the inner peripheral side of the second folded ring is fixed to the outer side of the auxiliary magnet; the first skeleton acts as the dome of the first diaphragm, the outer peripheral side is fixed to the inner peripheral side of the first folded ring, the inner peripheral side is fixed to the outer peripheral side of the second folded ring; and the outer peripheral side of the first folded ring is fixed on the frame.

8. The sounding device as described in claim 7, wherein, the first skeleton includes a first section which is annular, and a second section bent and extended from the inner peripheral side of the first section to the first voice coil, and a third section that is bent and extended from the inner peripheral side of the first section to the direction of the magnetic yoke; the first voice coil is fixed on the side of the second section close to the magnetic yoke, the side of the second section away from the magnetic yoke is fixed to the outer peripheral side of the second folded ring; the first vibration system further includes an elastic support assembly arranged spaced from the first folded ring; one end of the elastic support assembly is fixed on the frame, and the other end of the elastic support assembly is fixed on the third section.

* * * * *